(12) United States Patent
Oda et al.

(10) Patent No.: US 8,785,029 B2
(45) Date of Patent: Jul. 22, 2014

(54) CONNECTION PLATE FOR BATTERY TERMINALS AND METHOD FOR MANUFACTURING CONNECTION PLATE FOR BATTERY TERMINALS

(75) Inventors: Yoshimitsu Oda, Suita (JP); Masaharu Yamamoto, Kanan-cho (JP); Masaaki Ishio, Osaka (JP)

(73) Assignee: Neomax Materials Co., Ltd., Suita-shi (JP)

( * ) Notice: Subject to any disclaimer, the term of this patent is extended or adjusted under 35 U.S.C. 154(b) by 0 days.

(21) Appl. No.: 13/996,278

(22) PCT Filed: Dec. 7, 2011

(86) PCT No.: PCT/JP2011/078335
§ 371 (c)(1),
(2), (4) Date: Jun. 20, 2013

(87) PCT Pub. No.: WO2012/090668
PCT Pub. Date: Jul. 5, 2012

(65) Prior Publication Data
US 2013/0316217 A1 Nov. 28, 2013

(30) Foreign Application Priority Data
Dec. 28, 2010 (JP) ................. 2010-292917

(51) Int. Cl.
*H01M 2/20* (2006.01)
*H01R 43/02* (2006.01)
*H01B 1/02* (2006.01)
*B21K 23/04* (2006.01)
*H01M 10/0525* (2010.01)

(52) U.S. Cl.
CPC ............ *H01M 2/202* (2013.01); *H01B 1/023* (2013.01); *H01B 1/026* (2013.01); *H01R 43/0221* (2013.01); *B21K 23/04* (2013.01); *H01M 10/0525* (2013.01); *H01M 2220/20* (2013.01)
USPC ............................... 429/121; 29/879; 29/885

(58) Field of Classification Search
CPC ................... H01M 2/20–2/22; B23K 26/3206; B23K 20/02; B21K 23/04; B21K 28/24; B21K 28/26; H01B 1/02; H01B 1/023; H01B 1/026
USPC .................. 429/121; 29/874, 877–879, 885
See application file for complete search history.

(56) References Cited

U.S. PATENT DOCUMENTS

| | | |
|---|---|---|
| 2001/0049054 A1 | 12/2001 | Enomoto et al. |
| 2005/0100785 A1 | 5/2005 | Enomoto et al. |
| 2009/0123830 A1 | 5/2009 | Kato et al. |
| 2011/0064993 A1 | 3/2011 | Ochi |
| 2011/0293995 A1 | 12/2011 | Sasaki et al. |

FOREIGN PATENT DOCUMENTS

| | | |
|---|---|---|
| JP | 2002-246004 A | 8/2002 |
| JP | 2002-358945 A | 12/2002 |
| JP | 2011-060623 A | 3/2011 |
| JP | 2011-210482 A | 10/2011 |
| WO | 2007/004335 A1 | 1/2007 |
| WO | 2010/087472 A1 | 8/2010 |

OTHER PUBLICATIONS

International Search Report for PCT/JP2011/078335, mailing date of Feb. 21, 2012; With English translation.

*Primary Examiner* — Edu E Enin-Okut
(74) *Attorney, Agent, or Firm* — Westerman, Hattori, Daniels & Adrian, LLP

(57) ABSTRACT

A connection plate for battery terminals capable of inhibiting a base and a battery terminal connection portion from being detached from each other is provided. This connection plate for battery terminals (2) includes a battery terminal connection portion (4) fitted into a second hole (31) of a base (3) made of first metal, including a hole for connection (42) into which a second battery terminal (1b) is inserted and a flange portion (4b), while the battery terminal connection portion is constituted by at least a first layer (40) made of second metal, arranged on a side opposite to the base and a second layer (41) made of third metal, arranged between the base and the first layer.

20 Claims, 9 Drawing Sheets

CONNECTION PLATE FOR BATTERY TERMINALS AND METHOD FOR MANUFACTURING CONNECTION PLATE FOR BATTERY TERMINALS

TECHNICAL FIELD

The present invention relates to a connection plate for battery terminals and a method for manufacturing a connection plate for battery terminals.

BACKGROUND ART

In general, a connection plate for battery terminals including a battery terminal connection portion is known. Such a connection plate for battery terminals is disclosed in Japanese Patent Laying-Open No. 2002-358945, for example.

In the aforementioned Japanese Patent Laying-Open No. 2002-358945, there is disclosed a connection structure of lithium secondary cells (a connection plate for battery terminals) including a plate-like Al member having a hole into which an external terminal member made of Cu is inserted and an annular Cu member arranged on the inner peripheral surface of the hole of the Al member by interference fit. In this connection structure of lithium secondary cells, the inner peripheral surface of the annular Cu member arranged on the inner peripheral surface of the hole of the Al member and the outer peripheral surface of the external terminal member made of Cu inserted into the hole of the Al member are bonded to each other by welding.

PRIOR ART DOCUMENT

Patent Document

Patent Document 1: Japanese Patent Laying-Open No. 2002-358945

SUMMARY OF THE INVENTION

Problem to be Solved by the Invention

However, in the connection structure of lithium secondary cells disclosed in the aforementioned Patent Laying-Open No. 2002-358945, thermal expansion may cause the inner diameter of the hole of the Al member to be larger than the outer diameter of the annular Cu member when heat is applied to the connection structure even in a case where the annular Cu member is arranged on the inner peripheral surface of the hole of the Al member by interference fit. In this case, there is such a problem that the Cu member may be detached from the Al member.

The present invention has been proposed in order to solve the aforementioned problem, and an object of the present invention is to provide a connection plate for battery terminals and a method for manufacturing a connection plate for battery terminals each capable of inhibiting a base and a battery terminal connection portion from being detached from each other.

Means for Solving the Problem and Effects of the Invention

A connection plate for battery terminals according to a first aspect of the present invention includes a plate-like base including a first hole into which a first battery terminal made of first metal is inserted and a second hole into which a second battery terminal made of second metal different from the first metal is inserted, made of metal identical to the first metal and a battery terminal connection portion fitted into the inner peripheral surface of the second hole of the base, including a hole for connection into which the second battery terminal is inserted and a flange portion arranged on at least one of the upper surface and the lower surface of the base, while the battery terminal connection portion is constituted by at least a first layer made of metal identical to the second metal, arranged on a side opposite to the base and a second layer made of third metal different from the first metal and the second metal, arranged between the base and the first layer.

In the connection plate for battery terminals according to the first aspect of the present invention, as hereinabove described, the flange portion is formed on at least one of the upper surface and the lower surface of the base, whereby the flange portion can be retained on at least one of the upper surface and the lower surface of the base, and hence detachment of the battery terminal connection portion from the base can be inhibited. Furthermore, the plate-like base made of the metal identical to the first metal includes the first hole and the second hole, and the battery terminal connection portion including the first layer made of the metal identical to the second metal and arranged on the side opposite to the base is fitted into the inner peripheral surface of the second hole of the base, whereby the first battery terminal and the base, both of which are made of the identical first metal, can be bonded to each other, and the second battery terminal and the first layer of the battery terminal connection portion, both of which are made of the identical second metal, can be bonded to each other. Thus, electric resistance at both a bonding position between the first battery terminal and the base and a bonding position between the second battery terminal and the first layer of the battery terminal connection portion can be reduced. In addition, the battery terminal connection portion is constituted by the first layer made of the metal identical to the second metal, arranged on the side opposite to the base and the second layer made of the third metal different from the first metal and the second metal, arranged between the base and the first layer, whereby the second layer arranged between the base and the first layer can inhibit reaction of the first metal with the second metal also in a case where the connection plate for battery terminals is so configured that the first metal reacts with the second metal when the first metal constituting the base comes into direct contact with the second metal constituting the first layer.

Preferably in the aforementioned connection plate for battery terminals according to the first aspect, an intermetallic compound layer containing alloy made of the first metal constituting the base and the third metal constituting the second layer is formed on an interface between the base and the second layer of the battery terminal connection portion. According to this structure, the intermetallic compound layer can improve bonding strength between the base and the battery terminal connection portion, and hence detachment of the battery terminal connection portion from the base can be further inhibited.

Preferably in this case, the intermetallic compound layer is formed on an interface between the inner peripheral surface of the second hole of the base and the second layer of the battery terminal connection portion and on an interface between at least one of the upper surface and the lower surface of the base and the second layer of the battery terminal connection portion in the flange portion. According to this structure, the intermetallic compound layer can improve both bonding strength between the inner peripheral surface of the second hole of the base and the battery terminal connection portion and bonding strength between at least one of the upper surface and the lower surface of the base and the battery terminal connection portion. Thus, detachment of the battery terminal connection portion from the base can be further inhibited.

Preferably in the aforementioned connection plate for battery terminals according to the first aspect, the battery terminal connection portion is made of a cladding material constituted by at least the first layer and the second layer. According to this structure, the first layer and the second layer are bonded to each other by applying a prescribed pressure thereto, whereby the battery terminal connection portion constituted by at least the first layer and the second layer can be easily formed. In addition, the thickness of the second layer can be easily adjusted, unlike a case where the third metal constituting the second layer is plated on a surface of the first layer.

Preferably in the aforementioned connection plate for battery terminals according to the first aspect, the first metal is one of Al and Cu, the second metal is the other of Al and Cu, and the third metal is Ni. According to this structure, the second layer made of Ni can inhibit direct contact of Al (one of the base and the first layer of the battery terminal connection portion) with Cu (the other of the base and the first layer of the battery terminal connection portion). Thus, the second layer made of Ni arranged between the base and the first layer can inhibit corrosion of Al resulting from penetration of a water droplet or the like into a boundary portion between the base and the first layer of the battery terminal connection portion.

Preferably in this case, the second layer of the battery terminal connection portion has a thickness of at least 5 μm. According to this structure, the second layer made of Ni can sufficiently inhibit direct contact of the first layer of the battery terminal connection portion with the base, and fracture of the second layer made of Ni due to the excessively small thickness of the second layer made of Ni can be inhibited when the battery terminal connection portion is fitted into the inner peripheral surface of the second hole of the base.

Preferably in the aforementioned connection plate for battery terminals in which the third metal is Ni, the first metal is Al, the second metal is Cu, and the thickness of the first layer made of Cu is larger than the thickness of the second layer made of Ni in the battery terminal connection portion. According to this structure, Cu has electric resistance smaller than that of Ni, so that excessive increase in electric resistance in the battery terminal connection portion due to the thickness of the first layer can be inhibited also in a case where the thickness of the first layer is rendered larger than the thickness of the second layer.

Preferably in the aforementioned connection plate for battery terminals according to the first aspect, the flange portion is annularly formed to circumferentially surround the second hole. According to this structure, the flange portion can be arranged to surround the second hole on the upper surface or the lower surface of the base, and hence the flange portion can be sufficiently retained on the upper surface or the lower surface of the base. Thus, detachment of the battery terminal connection portion from the base can be further inhibited.

Preferably in the aforementioned connection plate for battery terminals according to the first aspect, the thickness of the flange portion is at least the thickness of a portion fitted into the inner peripheral surface of the second hole of the base in the battery terminal connection portion. According to this structure, the strength of the flange portion can be improved, and hence deformation of the flange portion in the thickness direction can be inhibited. Thus, the flange portion can be inhibited from failing to be stably retained on the upper surface or the lower surface of the base due to deformation of the flange portion in the thickness direction even if external force is applied to the battery terminal connection portion along the insertion direction of the second battery terminal.

Preferably in the aforementioned connection plate for battery terminals according to the first aspect, the second battery terminal is configured to be inserted into the hole for connection from the side of the lower surface of the base toward the side of the upper surface thereof, and the flange portion is arranged on at least the upper surface of the base. According to this structure, the flange portion arranged on the upper surface of the base can inhibit the battery terminal connection portion from being detached from (coming off) the base from the side of the upper surface of the base toward the side of the lower surface of the base into which the second battery terminal is inserted.

Preferably in the aforementioned connection plate for battery terminals according to the first aspect, the flange portion has a first flange portion arranged on the upper surface of the base and a second flange portion arranged on the lower surface of the base. According to this structure, the first flange portion and the second flange portion can be retained on the upper surface and the lower surface of the base, respectively, and hence detachment of the battery terminal connection portion from the base can be reliably inhibited.

Preferably in this case, the second battery terminal is configured to be inserted into the hole for connection from the side of the lower surface of the base toward the side of the upper surface thereof, and the thickness of the second flange portion is smaller than the thickness of the first flange portion in the battery terminal connection portion. According to this structure, even in a case where the second battery terminal is inserted into the hole for connection from the side of the lower surface of the base toward the side of the upper surface thereof, the thickness of the second flange portion is smaller (thinner), so that the second battery terminal can be brought closer to the lower surface of the base along the insertion direction. Thus, the second battery terminal can be reliably arranged in the second hole of the base through the battery terminal connection portion.

Preferably in the aforementioned connection plate for battery terminals according to the first aspect, the battery terminal connection portion is constituted by the first layer, the second layer, and a third layer arranged on the side of the first layer closer to the hole for connection, made of fourth metal having higher corrosion resistance as compared with the second metal constituting the first layer. According to this structure, the third layer arranged on the side of the first layer closer to the hole for connection, made of the fourth metal having higher corrosion resistance as compared with the second metal can inhibit corrosion of the first layer made of the second metal.

Preferably in this case, the fourth metal constituting the third layer of the battery terminal connection portion is made of a metal material absorbing more laser light employed in laser welding than the second metal constituting the second battery terminal. According to this structure, the third layer arranged on the side of the hole for connection can highly absorb the laser light and easily generate heat when the battery terminal connection portion and the second battery terminal inserted into the hole for connection of the battery terminal connection portion are bonded to each other by laser welding, and hence the battery terminal connection portion and the second battery terminal can be more easily laser-welded to each other in the hole for connection as compared with a case where no third layer is provided.

Preferably in the aforementioned connection plate for battery terminals having the battery terminal connection portion constituted by the first layer, the second layer, and the third layer, the third metal and the fourth metal are made of identical metal. According to this structure, the metallic properties of the second layer located on a first surface of the plate-like battery terminal connection portion, made of the third metal and the third layer located on a second surface of this battery terminal connection portion, made of the fourth metal become similar to each other in a case where the plate-like battery terminal connection portion is deformed along the inner peripheral surface of the second hole by press working or the like and is inserted into the inner peripheral surface of the second hole after being placed on the upper surface or the lower surface of the base in a manufacturing process. Therefore, even if the plate-like battery terminal connection portion is mistakenly fitted into the second hole such that the second layer is located on the side of the hole for connection, which is a side normally provided with the third layer, and the third layer is located on the side of the inner peripheral surface of the second hole, which is a side normally provided with the second layer, the mistakenly arranged second layer can exhibit such an effect that corrosion of the first layer made of the second metal is inhibited, which is the original effect of the third layer. Similarly, the mistakenly arranged third layer can exhibit such an effect that reaction of the base made of the first metal with the first layer made of the second metal is inhibited, which is the original effect of the second layer.

Preferably in the aforementioned connection plate for battery terminals according to the first aspect, the first hole of the base is so configured that the first battery terminal is inserted thereinto without the battery terminal connection portion therebetween, and the second hole of the base is so configured that the second battery terminal is inserted thereinto with the battery terminal connection portion therebetween. According to this structure, the first battery terminal is inserted into the first hole of the base without the battery terminal connection portion therebetween, whereby no battery terminal connection portion is arranged in the first hole, so that the number of components can be reduced.

A method for manufacturing a connection plate for battery terminals according to a second aspect of the present invention includes steps of providing a first hole into which a first battery terminal made of first metal is inserted and a second hole into which a second battery terminal made of second metal different from the first metal is inserted in a plate-like base made of metal identical to the first metal, preparing a plate-like member constituted by at least a first layer made of metal identical to the second metal and a second layer made of third metal different from the first metal and the second metal, and forming a battery terminal connection portion including a hole for connection into which the second battery terminal is inserted and a flange portion arranged on at least one of the upper surface and the lower surface of the base, fitted into the inner peripheral surface of the second hole of the base by press working in a state where the side of the second layer of the plate-like member is arranged to cover the second hole of the base and a part of the upper surface of the base.

In the method for manufacturing a connection plate for battery terminals according to the second aspect of the present invention, as hereinabove described, the flange portion is formed on at least one of the upper surface and the lower surface of the base, whereby the flange portion can be retained on at least one of the upper surface and the lower surface of the base, and hence detachment of the battery terminal connection portion from the base can be inhibited. Furthermore, by the press working in the state where the side of the second layer of the plate-like member is arranged to cover the second hole of the base and the part of the upper surface of the base, the battery terminal connection portion can be easily fitted into the inner peripheral surface of the second hole of the base while the hole for connection into which the second battery terminal is inserted is formed. In addition, the step of providing the first hole and the second hole in the plate-like base made of the metal identical to the first metal and the step of forming the battery terminal connection portion including the first layer made of the metal identical to the second metal and arranged on the side opposite to the base, fitted into the inner peripheral surface of the second hole of the base are included, whereby the first battery terminal and the base, both of which are made of the identical first metal, can be bonded to each other, and the second battery terminal and the first layer of the battery terminal connection portion, both of which are made of the identical second metal, can be bonded to each other. Thus, electric resistance at both a bonding position between the first battery terminal and the base and a bonding position between the second battery terminal and the first layer of the battery terminal connection portion can be reduced. Moreover, the step of preparing the plate-like member constituted by at least the first layer made of the metal identical to the second metal and the second layer made of the third metal different from the first metal and the second metal is included, whereby the second layer arranged between the base and the first layer can inhibit reaction of the first metal with the second metal also in a case where the connection plate for battery terminals is so configured that the first metal reacts with the second metal when the first metal constituting the base comes into direct contact with the second metal constituting the first layer.

Preferably, the aforementioned method for manufacturing a connection plate for battery terminals according to the second aspect further includes a step of forming an intermetallic compound layer containing alloy made of the first metal constituting the base and the third metal constituting the second layer on an interface between the base and the second layer of the battery terminal connection portion by diffusion annealing after the step of forming the battery terminal connection portion. According to this structure, the intermetallic compound layer formed by diffusion annealing can improve bonding strength between the base and the battery terminal connection portion, and hence detachment of the battery terminal connection portion from the base can be further inhibited.

Preferably in the aforementioned method for manufacturing a connection plate for battery terminals according to the second aspect, the step of preparing the plate-like member includes a step of forming the plate-like member made of a cladding material by applying a prescribed pressure to bond a first metal plate made of the second metal and a second metal plate made of the third metal to each other. According to this structure, the battery terminal connection portion constituted by at least the first layer and the second layer can be easily formed. In addition, the thickness of the second layer can be easily adjusted, unlike a case where the third metal constituting the second layer is plated on a surface of the first layer.

Preferably in the aforementioned method for manufacturing a connection plate for battery terminals according to the second aspect, the step of forming the battery terminal connection portion includes a step of forming the battery terminal connection portion including the flange portion and the hole for connection, fitted into the inner peripheral surface of the second hole of the base by the press working in a state where the side of the second layer of the plate-like member circularly or annularly formed is arranged to cover the second hole of the base and the part of the upper surface of the base. According to this structure, a peripheral region of the second hole can be circumferentially covered in a direction separating from the second hole, and hence the flange portion of the battery terminal connection portion circumferentially arranged in the direction separating from the second hole can be easily formed.

MODES FOR CARRYING OUT THE INVENTION

Embodiments of the present invention are hereinafter described on the basis of the drawings.

First Embodiment

The structure of lithium ion battery connections 100 according to a first embodiment of the present invention is now described with reference to FIGS. 1 to 8.

Figure 1:
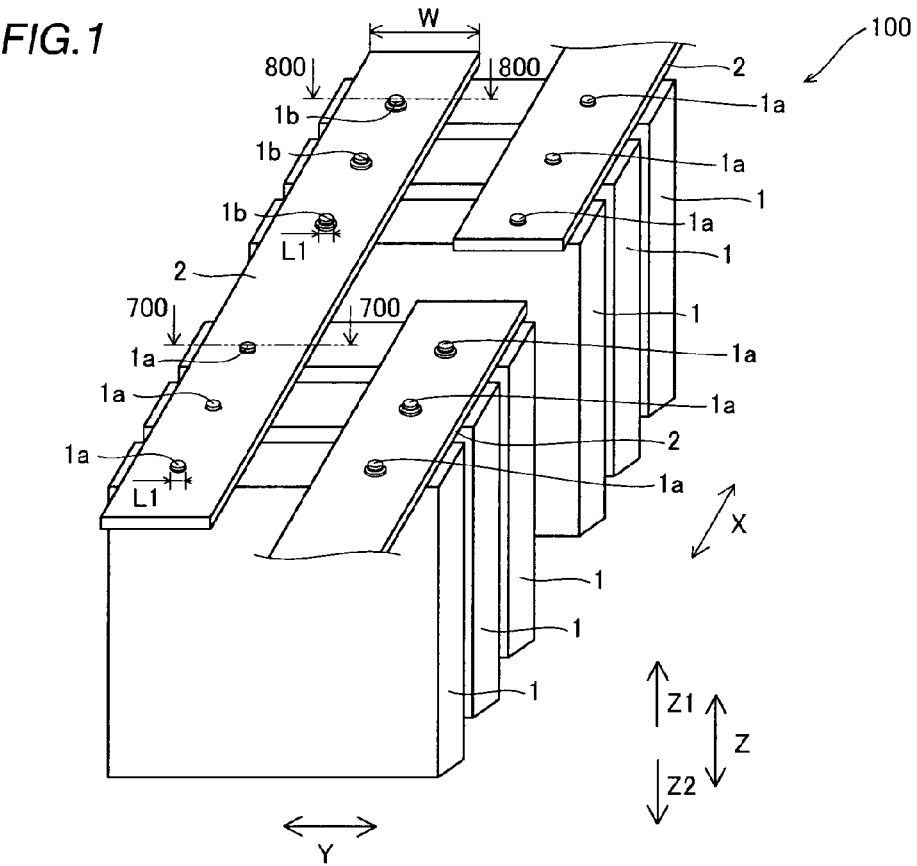
FIG. 1 A perspective view showing the structure of lithium ion battery connections according to a first embodiment of the present invention.

The lithium ion battery connections 100 according to the first embodiment of the present invention are a large battery system employed in an electric vehicle (EV), a hybrid electric vehicle (HEV), a residential electric storage system, etc. These lithium ion battery connections 100 are configured by electrically connecting a plurality of lithium ion batteries 1 by a plurality of bus bars 2, as shown in FIG. 1. The bus bars 2 are examples of the "connection plate for battery terminals" in the present invention.

Specifically, in the lithium ion battery connections 100, the lithium ion batteries 1 are arranged in threes along a prescribed direction (a direction X). These lithium ion batteries 1 include positive electrode-side terminals 1a made of Al and negative electrode-side terminals 1b made of Cu. These positive electrode-side terminals 1a and negative electrode-side terminals 1b each have a columnar portion with a diameter L1 of about 4.8 mm extending in a direction Z. The positive electrode-side terminals 1a are examples of the "first battery terminal" in the present invention, and the negative electrode-side terminals 1b are examples of the "second battery terminal" in the present invention. Al is an example of the "first metal" in the present invention, and Cu is an example of the "second metal" in the present invention.

Positive electrode-side terminals 1a of three lithium ion batteries 1 are electrically connected to negative electrode-side terminals 1b of another three lithium ion batteries 1 adjacent on one side by a single bus bar 2. Furthermore, negative electrode-side terminals 1b of the three lithium ion batteries 1 are electrically connected to positive electrode-side terminals 1a of another three lithium ion batteries 1 adjacent on another side by a single bus bar 2. Thus, in the lithium ion battery connections 100, three lithium ion batteries 1 are connected in parallel, and the lithium ion batteries 1 are connected in series, defining the three lithium ion batteries 1 connected in parallel as a unit.

Figure 2:
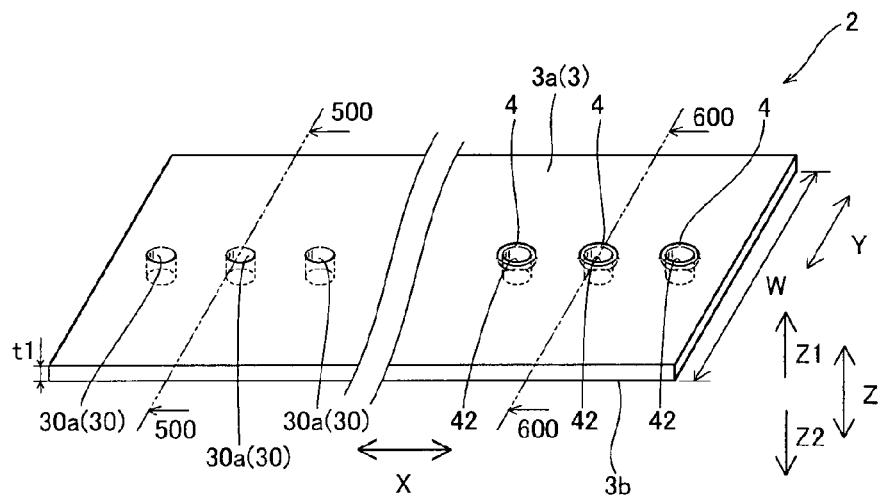
FIG. 2 A perspective view showing the structure of a bus bar mounted on the lithium ion battery connections according to the first embodiment of the present invention.

The bus bars 2 each are a plate-like member including a base 3 made of Al, which is metal identical to the positive electrode-side terminals 1a, and connection portions 4, as shown in FIG. 2. The bus bars 2 (bases 3) each have a width W of about 50 mm in a direction (a direction Y) orthogonal to the direction X and a thickness t1 of about 2 mm in the thickness direction (the direction Z). The connection portions 4 are examples of the "battery terminal connection portion" in the present invention.

Figure 3:
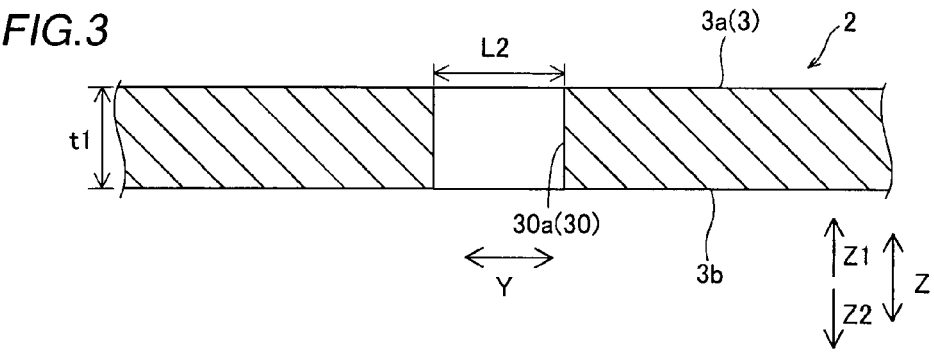
FIG. 3 A sectional view taken along the line 500-500 in FIG. 2.
Figure 4:
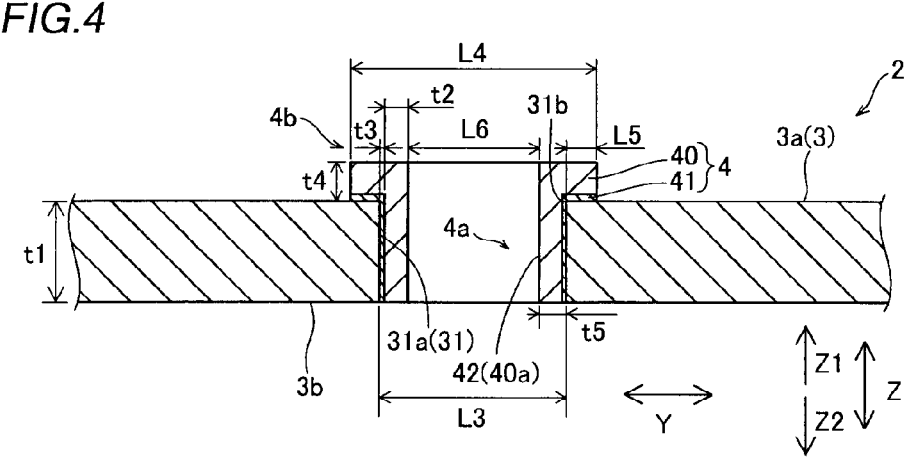
FIG. 4 A sectional view taken along the line 600-600 in FIG. 2.

The base 3 is formed with three respective holes 30 in which the positive electrode-side terminals 1a of the lithium ion batteries 1 are arranged, and three respective holes 31 in which the negative electrode-side terminals 1b of the lithium ion batteries 1 and the connection portions 4 are arranged. These three holes 30 and three holes 31 are arranged to be aligned at substantially equal intervals in the direction X. As shown in FIG. 3, the holes 30 each are configured to pass through the base 3 in the thickness direction (the direction Z) and have a diameter L2 of about 5 mm. As shown in FIG. 4, the holes 31 each are configured to pass through the base 3 in the thickness direction and have a diameter L3 of about 7 mm.

The holes 30 and 31 are examples of the "first hole" and the "second hole" in the present invention, respectively.

According to the first embodiment, whereas the connection portions 4 are not fitted into the holes 30 of the base 3, the connection portions 4 are fitted into the holes 31 of the base 3. The connection portions 4 have cylindrical portions 4a fitted along the inner peripheral surfaces 31a of the holes 31 of the base 3 and flange portions 4b annularly formed to circumferentially surround peripheral regions of open ends 31b of the holes 31 on a Z1 side on the upper surface 3a (the Z1 side) of the base 3. The cylindrical portions 4a and the flange portions 4b are connected to each other at positions corresponding to the open ends 31b.

Figure 5:
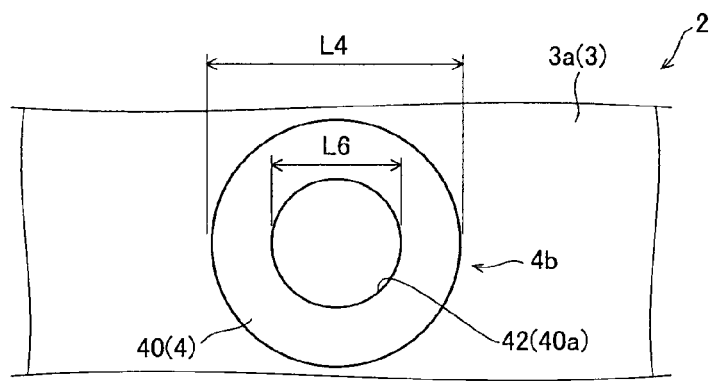
FIG. 5 A top plan view showing a structure in the periphery of a hole for connection formed in the bus bar according to the first embodiment of the present invention.

As shown in FIG. 5, the flange portions 4b have centers substantially identical to the centers of the holes 31. Furthermore, the flange portions 4b each are so configured that the outer diameter L4 thereof is about 9 mm. In other words, the flange portions 4b are formed to extend by a length L5 (see FIG. 4) of about 1 mm in a direction (a radial direction) separating from the open ends 31b of the holes 31 on the Z1 side.

According to the first embodiment, the connection portions 4 are made of a two-layered cladding material having a Cu layer 40 made of metal (Cu) identical to the negative electrode-side terminals 1b and a Ni layer 41 bonded to each other, as shown in FIG. 4. Ni layers 41 of the connection portions 4 are bonded to the inner peripheral surfaces 31a of the holes 31 and the upper surface 3a of the base 3. The Cu layer 40 and the Ni layer 41 are examples of the "first layer" and the "second layer" in the present invention, respectively. Ni is an example of the "third metal" in the present invention.

In the cylindrical portions 4a of the connection portions 4 arranged inside the holes 31, Cu layers 40 each have a thickness t2 of about 1000 μm, and the Ni layers 41 each have a thickness t3 of about 20 μm. In other words, the thickness t2 (about 1000 μm) of each of the Cu layers 40 is larger than the thickness t3 (about 20 μm) of each of the Ni layers 41. In the flange portions 4b of the connection portions 4 arranged on the upper surface 3a of the base 3, the Cu layers 40 each have a thickness larger than the thickness t2 of each of the Cu layers 40 in the cylindrical portions 4a, and the Ni layers 41 each have a thickness larger than the thickness t3 of each of the Ni layers 41 in the cylindrical portions 4a. In other words, the thickness t4 of each of the connection portions 4 in the flange portions 4b is larger than the thickness t5 (=t2+t3) of each of the connection portions 4 in the cylindrical portions 4a. The connection portions 4 are so configured that the ratio (about 50:1) of the thicknesses t2 of the Cu layers 40 in the cylindrical portions 4a of the connection portions 4 to the thicknesses t3 of the Ni layers 41 in the cylindrical portions 4a of the connection portions 4 is substantially equal to the ratio of the thicknesses of the Cu layers 40 in the flange portions 4b to the thicknesses of the Ni layers 41 in the flange portions 4b.

Inside the holes 31, holes for connection 42 are formed by the inner peripheral surfaces 40a of the Cu layers 40 of the connection portions 4. The holes for connection 42 are so configured that the negative electrode-side terminals 1b (see FIG. 1) of the lithium ion batteries 1 are inserted thereinto. Furthermore, the holes for connection 42 pass through the base 3 in the thickness direction (the direction Z) and each have a diameter L6 of about 5 mm.

Figure 6:
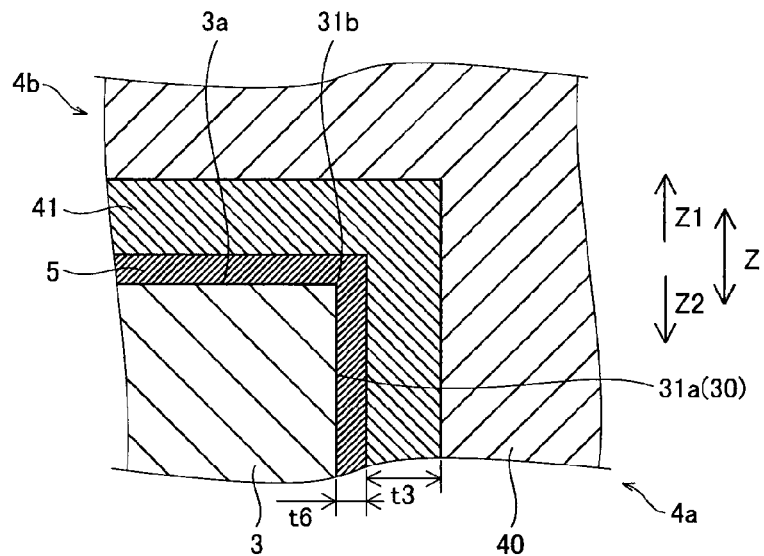
FIG. 6 An enlarged sectional view showing a bonding state between a hole of the bus bar according to the first embodiment of the present invention and a connection portion to each other.

According to the first embodiment, intermetallic compound layers 5 are formed on interfaces between the Ni layers 41 of the connection portions 4 and the inner peripheral surfaces 31a of the holes 31 and on interfaces between the Ni layers 41 of the connection portions 4 and the upper surface 3a of the base 3, as shown in FIG. 6. The intermetallic compound layers 5 contain Al—Ni alloy formed by causing Ni of the Ni layers 41 and Al of the base 3 to react with each other. The intermetallic compound layers 5 each have a thickness t6 of at least about 1 μm and not more than about 5 μm.

The Al—Ni alloy of the intermetallic compound layers 5 is capable of improving electrical conductivity between the connection portions 4 and the base 3. Furthermore, the Al—Ni alloy is capable of further improving bonding strength between the base 3 and the connection portions 4 than Al—Cu alloy formed by causing Al of the base 3 and Cu of the Cu layers 40 of the connection portions 4 to react with each other. The thickness t6 of each of the intermetallic compound layers 5 is very small, and hence illustration of the intermetallic compound layers 5 is omitted in the drawings except FIGS. 6 and 15.

Figure 7:
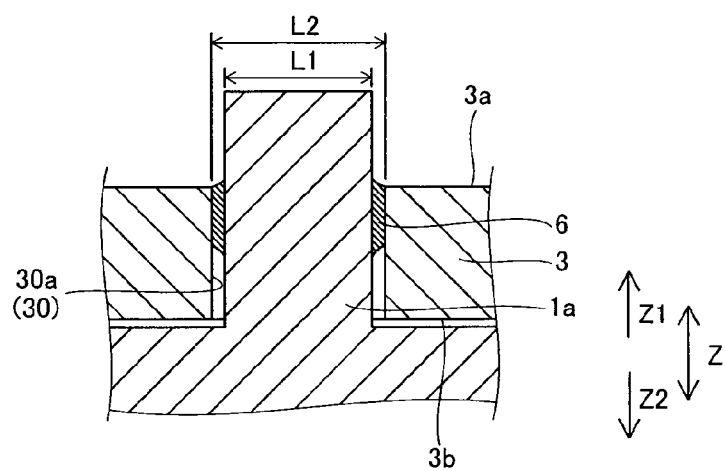
FIG. 7 A sectional view taken along the line 700-700 in FIG. 1.

As shown in FIG. 7, the positive electrode-side terminals 1a inserted into the holes 30 from the side (a Z2 side) of a lower surface 3b and the inner peripheral surfaces 30a of the holes 30 of the base 3 are bonded to each other through weld portions 6 made of Al, formed by laser welding. In other words, the weld portions 6 each are formed with a thickness of about 0.1 mm between the diameter L1 (about 4.8 mm) of each of the positive electrode-side terminals 1a and the diameter L2 (about 5 mm) of each of the holes 30. The weld portions 6 are provided up to the vicinities of the centers of the holes 30 in the direction Z.

Figure 8:
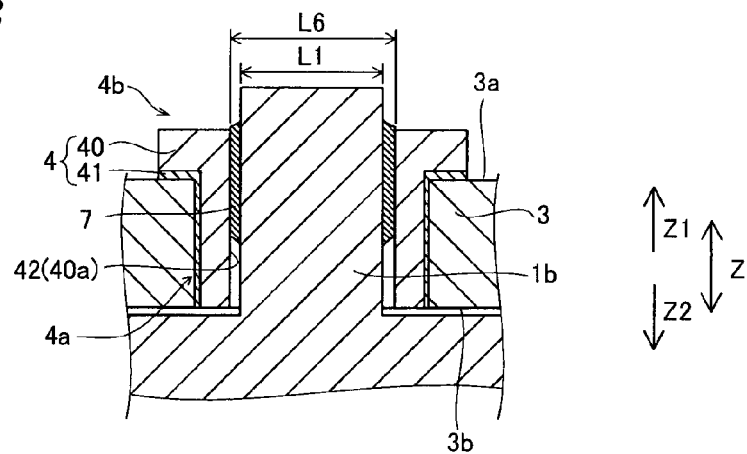
FIG. 8 A sectional view taken along the line 800-800 in FIG. 1.

As shown in FIG. 8, the negative electrode-side terminals 1b inserted into the holes for connection 42 from the side (the Z2 side) of the lower surface 3b and the inner peripheral surfaces 40a of the Cu layers 40 of the connection portions 4 are bonded to each other through weld portions 7 made of Cu, formed by laser welding. In other words, the weld portions 7 each are formed with a thickness of about 0.1 mm between the diameter L1 (about 4.8 mm) of each of the negative electrode-side terminals 1b and the diameter L6 (about 5 mm) of each of the holes for connection 42. The weld portions 7 are provided up to the vicinities of the centers of the holes for connection 42 in the direction Z.

A manufacturing process for the lithium ion battery connections 100 according to the first embodiment of the present invention is now described with reference to FIGS. 1, 2, and 6 to 11.

Figure 9:
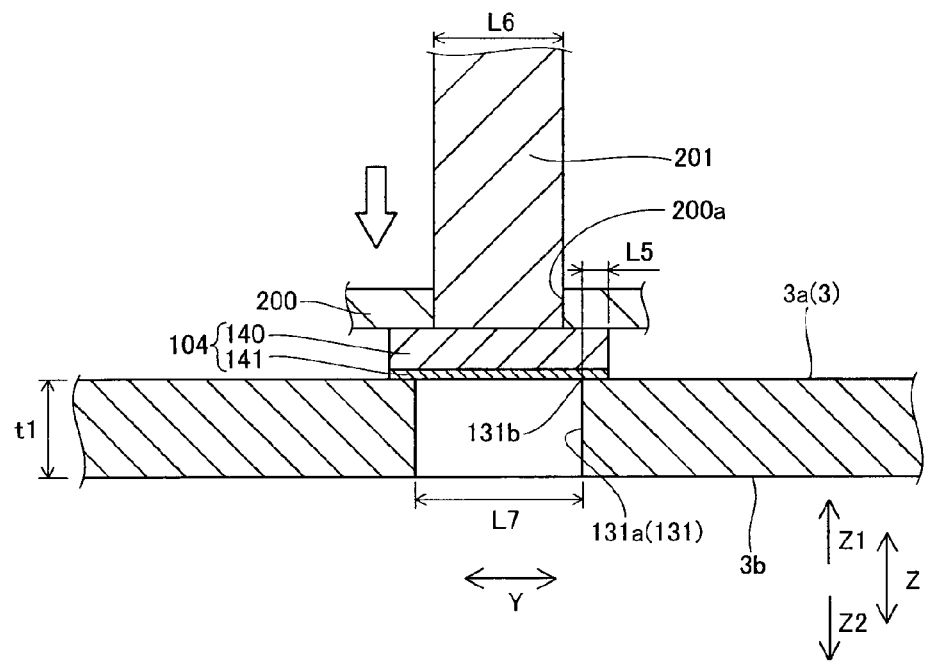
FIG. 9 A sectional view for illustrating a manufacturing process for the bus bar according to the first embodiment of the present invention.
Figure 10:
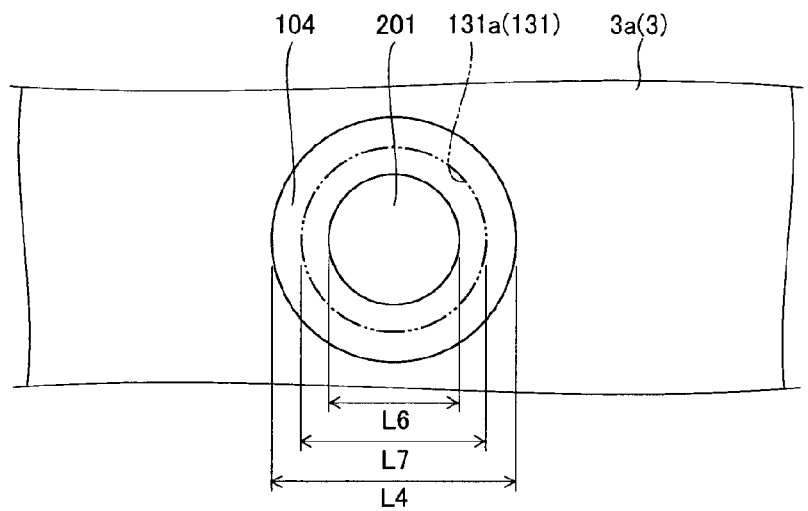
FIG. 10 A top plan view for illustrating the manufacturing process for the bus bar according to the first embodiment of the present invention.

First, a Cu plate (not shown) having a prescribed thickness and a Ni plate (not shown) having a thickness of about one-fiftieth of the thickness of the Cu plate are prepared. Then, in a state where the Ni plate is arranged on the lower surface (the surface on the Z2 side) of the Cu plate, the Cu plate and the Ni plate are bonded to each other while a prescribed pressure is applied thereto. Thus, a plate-like cladding material 104 having a Cu layer 140 made of Cu and a Ni layer 141 made of Ni bonded to each other is formed, as shown in FIG. 9. At this time, the cladding material 104 is so formed that the ratio of the thickness of the Cu layer 140 to the thickness of the Ni layer 141 is about 50:1. Thereafter, the formed plate-like cladding material 104 is shaped like a disc having a diameter L4 of about 9 mm, as shown in FIG. 10. The cladding material 104 is an example of the "plate-like member" in the present invention.

As shown in FIG. 9, the base 3 made of Al is prepared. The base 3 has a width W (see FIG. 2) of about 50 mm and a thickness t1 of about 2 mm. Then, the three holes 30 (see FIGS. 2 and 3) each having the diameter L2 of about 5 mm and three holes 131 each having a diameter L7 of about 6 mm are formed in prescribed positions of the base 3. The holes 131 each are so formed that the diameter L7 (about 6 mm)

thereof is smaller than the diameter L3 (about 7 mm) of each of the holes 31 of the base 3 in the bus bar 2 (a finished product).

Then, the cladding material 104 is arranged on the upper surface 3a of the base 3 from above (the Z1 side) such that the center of the disc-shaped cladding material 104 substantially coincides with the center of a hole 131 of the base 3 in a plan view (as viewed from above (the Z1 side)), as shown in FIG. 10. Thus, the cladding material 104 is arranged to cover an entire open end 131b of the hole 131 of the base 3 and the upper surface 3a of the base 3 by a length L5 (about 1 mm) in a direction (a radial direction) separating from the open end 131b of the hole 131.

Figure 11:
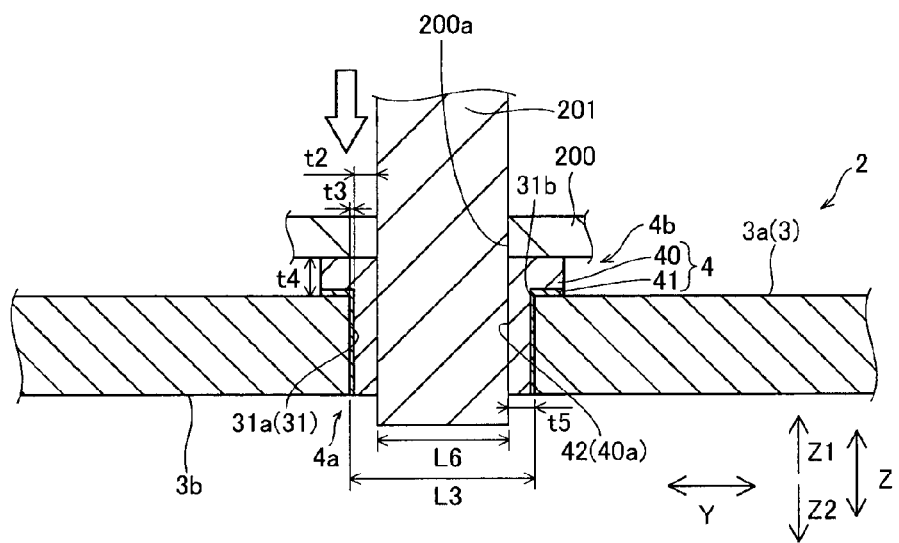
FIG. 11 A sectional view for illustrating the manufacturing process for the bus bar according to the first embodiment of the present invention.

Thereafter, a portion of the upper surface (the surface on the Z1 side) of the cladding material 104 arranged on the upper surface 3a of the base 3 is pressed with a pressing member 200 from above (the Z1 side). The pressing member 200 is formed with a hole 200a into which a columnar pressing machine 201 having a diameter L6 of about 5 mm is inserted in press working. The cladding material 104 is pressed with the pressing machine 201. At this time, the cladding material 104 is pressed in a state where the center of the disc-shaped cladding material 104 (the center of a hole 31 of the base 3) substantially coincides with the center of the pressing machine 201 in a plan view. Thus, the disc-shaped cladding material 104 is deformed to extend along the inner peripheral surface 131a of the hole 131 of the base 3 while the pressing machine 201 passes through the disc-shaped cladding material 104, as shown in FIG. 11. In this manner, a connection portion 4 constituted by a cylindrical portion 4a fitted along the inner peripheral surface 31a of the hole 31 and a flange portion 4b annularly formed to circumferentially surround a peripheral region of an open end 31b of the hole 31 on the Z1 side on the upper surface 3a of the base 3 is formed. At this time, the connection portion 4 is formed with a hole for connection 42 having a diameter substantially equal to the diameter L6 (about 5 mm) of the columnar pressing machine 201.

Furthermore, the inner diameter of the hole 131 (diameter L7: about 6 mm (see FIGS. 9 and 10)) of the base 3 is increased by press working, whereby the hole 31 having the diameter L3 (about 7 mm) is formed. In the cylindrical portion 4a of the connection portion 4, the thickness of the cladding material 104 is reduced by press working, whereby the thickness t2 of the Cu layer 40 becomes about 1000 μm, and the thickness t3 of the Ni layer 41 becomes about 20 μm. At this time, the ratio (about 50:1) of the thickness of the Cu layer 40 to the thickness of the Ni layer 41 is maintained.

After the connection portion 4 is fitted into all the three holes 31, diffusion annealing is performed on the base 3 to which the connection portions 4 are bonded under a temperature condition of at least about 200° C. and not more than about 580° C. and in one of a non-oxidation atmosphere, a reducing atmosphere, and a hydrogen atmosphere. Thus, Al of the base 3 and Ni of the Ni layers 41 of the connection portions 4 are diffused to the interfaces between the Ni layers 41 of the connection portions 4 and the inner peripheral surfaces 31a of the holes 31 of the base 3 and to the interfaces between the Ni layers 41 of the connection portions 4 and the upper surface 3a of the base 3 and react with each other thereon. Consequently, the intermetallic compound layers 5 (see FIG. 6) mainly containing the Al—Ni alloy are formed on the interfaces between the Ni layers 41 and the inner peripheral surfaces 31a of the holes 31 and on the interfaces between the Ni layers 41 and the upper surface 3a. Thus, the bus bar 2 shown in FIG. 2 is manufactured.

Then, the positive electrode-side terminals 1a of the lithium ion batteries 1 are inserted into the three respective holes 30 of the bus bar 2. Then, laser welding is performed with laser light having a wavelength of about 1064 nm emitted from a laser welding machine (not shown). Thus, the weld portions 6 made of Al are formed, and the positive electrode-side terminals 1a and the inner peripheral surfaces 30a of the holes 30 of the base 3 are bonded to each other, as shown in FIG. 7. Furthermore, the negative electrode-side terminals 1b of the lithium ion batteries 1 are inserted into the three respective holes for connection 42 circumferentially surrounded by the inner peripheral surfaces 40a of the Cu layers 40 of the connection portions 4. Then, laser welding is performed with laser light having a wavelength of about 1064 nm. Thus, the weld portions 7 made of Cu are formed, and the negative electrode-side terminals 1b and the inner peripheral surfaces 40a of the Cu layers 40 of the connection portions 4 are bonded to each other, as shown in FIG. 8. Consequently, the positive electrode-side terminals 1a of the three lithium ion batteries 1 and the negative electrode-side terminals 1b of another three lithium ion batteries 1 are electrically connected to each other.

Then, the lithium ion batteries 1 are connected in series by the plurality of bus bars 2, defining the three lithium ion batteries 1 as a unit. In this manner, the lithium ion battery connections 100 shown in FIG. 1 are manufactured.

According to the first embodiment, as hereinabove described, the annular flange portions 4b circumferentially surrounding the peripheral regions of the open ends 31b of the holes 31 on the Z1 side on the upper surface 3a of the base 3 are formed, whereby the flange portions 4b can be retained on the upper surface 3a of the base 3, and hence the connection portions 4 can be inhibited from being detached from (coming off) the base 3 from the side (the Z1 side) of the upper surface 3a of the base 3 toward the side (the Z2 side) of the lower surface 3b of the base 3. Furthermore, the holes 30 and the holes 31 are formed in the plate-like base 3 made of Al, and the connection portions 4 including the Cu layers 40 are fitted into the inner peripheral surfaces 31a of the holes 31 of the base 3, whereby the positive electrode-side terminals 1a and the base 3, both of which are made of identical Al, can be bonded to each other, and the negative electrode-side terminals 1b and the Cu layers 40 of the connection portions 4, both of which are made of identical Cu, can be bonded to each other. Thus, electric resistance at both bonding positions between the positive electrode-side terminals 1a and the base 3 and bonding positions between the negative electrode-side terminals 1b and the Cu layers 40 of the connection portions 4 can be reduced.

According to the first embodiment, as hereinabove described, the connection portions 4 are made of the two-layered cladding material having the Cu layer 40 made of Cu and the Ni layer 41 bonded to each other, whereby the Ni layers 41 arranged between the base 3 and the Cu layers 40 can inhibit reaction of the base 3 with the Cu layers 40 also in a case where the bus bar 2 is so configured that Al reacts with Cu when Al constituting the base 3 comes into direct contact with Cu constituting the Cu layers 40. Furthermore, the Cu plate and the Ni plate are bonded to each other by applying the prescribed pressure thereto, whereby the connection portions 4 constituted by the Cu layers 40 and the Ni layers 41 can be easily formed. In addition, the thicknesses t3 of the Ni layers 41 can be easily increased, unlike a case where Ni constituting the Ni layers 41 is plated on surfaces of the Cu layers 40.

According to the first embodiment, as hereinabove described, the intermetallic compound layers 5 mainly containing the Al—Ni alloy are formed on the interfaces between the Ni layers 41 of the connection portions 4 and the inner peripheral surfaces 31a of the holes 31, and the Ni layers 41 and the upper surface 3a of the base 3 by diffusion annealing, whereby the intermetallic compound layers 5 formed by diffusion annealing can improve both bonding strength between the inner peripheral surfaces 31a of the holes 31 of the base 3 and the connection portions 4 and bonding strength between the upper surface 3a of the base 3 and the connection portions 4. Thus, detachment of the connection portions 4 from the base 3 can be further inhibited.

According to the first embodiment, as hereinabove described, the base 3 is made of Al, the Cu layers 40 of the connection portions 4 are made of Cu, and the Ni layers 41 of the connection portions 4 are made of Ni, whereby the Ni layers 41 made of Ni can inhibit direct contact of Al (the base 3) with Cu (the Cu layers 40 of the connection portions 4). Thus, the Ni layers 41 made of Ni arranged between the base 3 and the Cu layers 40 can inhibit corrosion of Al resulting from penetration of a water droplet or the like into boundary portions between the base 3 and the Cu layers 40 of the connection portions 4.

According to the first embodiment, as hereinabove described, the Ni layers 41 of the connection portions 4 each are configured to have the thickness t3 of at least about 20 μm, whereby the Ni layers 41 made of Ni can sufficiently inhibit contact of the Cu layers 40 of the connection portions 4 with the base 3, and fracture of the Ni layers 41 due to the excessively small thicknesses t3 of the Ni layers 41 can be inhibited when the connection portions 4 are fitted into the inner peripheral surfaces 31a of the holes 31 of the base 3.

According to the first embodiment, as hereinabove described, the thickness t2 (about 1000 μm) of each of the Cu layers 40 is rendered larger than the thickness t3 (about 20 μm) of each of the Ni layers 41, whereby Cu has electric resistance smaller than that of Ni, so that excessive increase in electric resistance in the connection portions 4 due to the thicknesses t2 of the Cu layers 40 can be inhibited also in a case where the thickness t2 of each of the Cu layers 40 is rendered larger than the thickness t3 of each of the Ni layers 41.

According to the first embodiment, as hereinabove described, the flange portions 4b are annularly formed to circumferentially surround the peripheral regions of the open ends 31b of the holes 31 on the Z1 side, whereby the flange portions 4b can be arranged to surround the holes 31 on the upper surface 3a of the base 3, and hence the flange portions 4b can be sufficiently retained on the upper surface 3a of the base 3. Thus, detachment of the connection portions 4 from the base 3 can be further inhibited.

According to the first embodiment, as hereinabove described, the thicknesses t4 of the connection portions 4 in the flange portions 4b are rendered larger than the thicknesses t5 of the connection portions 4 in the cylindrical portions 4a, whereby the strength of the flange portions 4b can be improved, and hence deformation of the flange portions 4b in the thickness direction can be inhibited. Thus, the flange portions 4b can be inhibited from failing to be stably retained on the upper surface 3a of the base 3 due to deformation of the flange portions 4b in the thickness direction even if external force is applied to the connection portions 4 along the insertion direction (the direction Z) of the negative electrode-side terminals 1b.

According to the first embodiment, as hereinabove described, the connection portions 4 are fitted into the holes 31 of the base 3 whereas the connection portions 4 are not fitted into the holes 30 of the base 3, whereby the positive electrode-side terminals 1a are inserted into the holes 30 of the base 3 without the connection portions 4. Thus, no connection portion 4 is arranged in the holes 30, so that the number of components can be reduced.

According to the first embodiment, as hereinabove described, the cladding materials 104 are pressed from above (the Z1 side) in a state arranged on the upper surface 3a of the base 3 such that the centers of the disc-shaped cladding materials 104 substantially coincide with the centers of the holes 131 of the base 3, whereby the connection portions 4 can be easily fitted into the inner peripheral surfaces 31a of the holes 31 of the base 3 while the holes for connection 42 into which the negative electrode-side terminals 1b are inserted are formed, and the flange portions 4b of the connection portions 4 circumferentially arranged in the direction (the radial direction) separating from the holes 31 can be easily formed.

Modification of First Embodiment

A modification of the first embodiment of the present invention is now described with reference to FIGS. 11 to 13. In this modification of the first embodiment, a case where cladding materials 304 each having an annular shape in a plan view are employed instead of the disc-shaped cladding materials 104 according to the aforementioned first embodiment in a manufacturing process for the connection portions 4 is described. The cladding materials 304 are examples of the "plate-like member" in the present invention.

Figure 12:
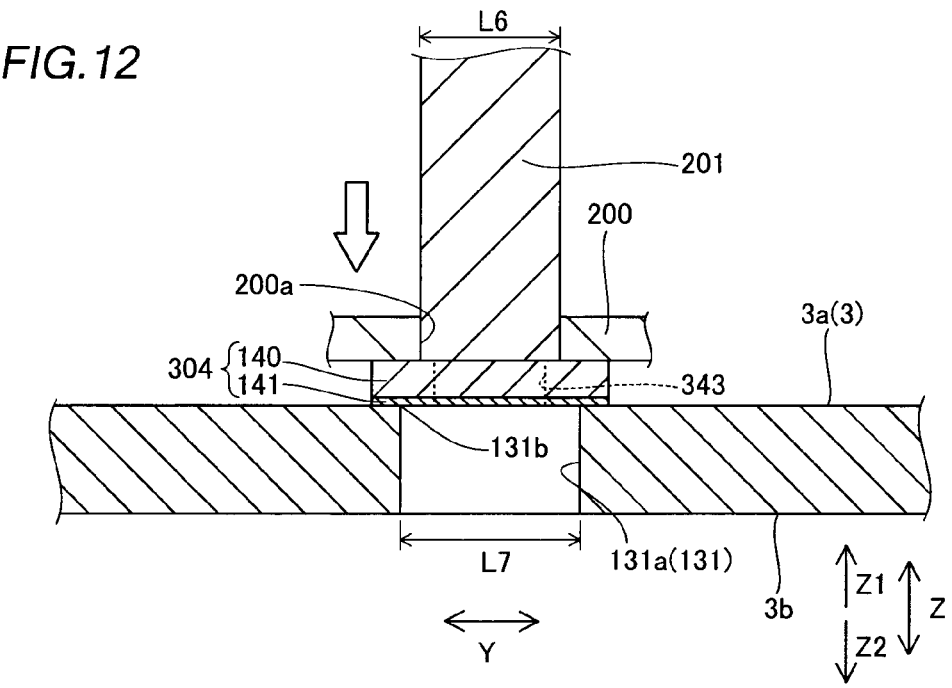
FIG. 12 A sectional view for illustrating a manufacturing process for a bus bar according to a modification of the first embodiment of the present invention.
Figure 13:
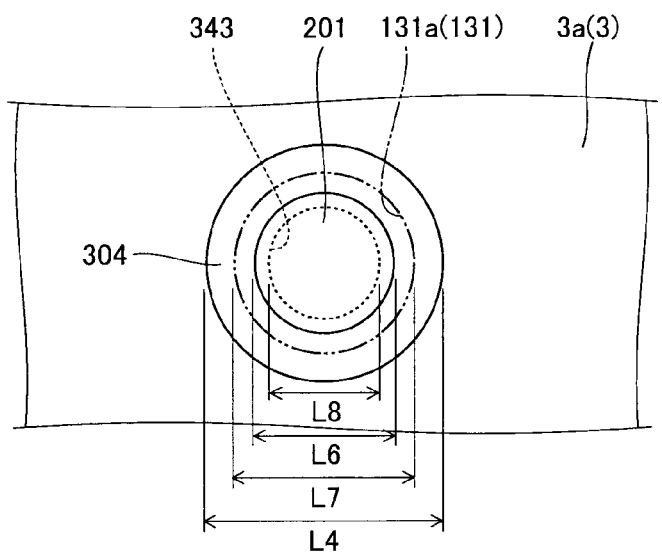
FIG. 13 A top plan view for illustrating the manufacturing process for the bus bar according to the modification of the first embodiment of the present invention.

In a manufacturing process for the lithium ion battery connections 100 according to the modification of the first embodiment of the present invention, a plate-like cladding material 304 having the Cu layer 140 made of Cu and the Ni layer 141 made of Ni bonded to each other is formed, as shown in FIG. 12, similarly to the manufacturing process for the lithium ion battery connections 100 according to the first embodiment. In this case, the formed plate-like cladding material 304 is annularly shaped in a plan view, as shown in FIG. 13. Specifically, the cladding material 304 is shaped to have an outer diameter L4 of about 9 mm, and a through-hole 343 having an inner diameter L8 of about 4 mm is formed in a central portion of the cladding material 304.

Then, the cladding material 304 is arranged on the upper surface 3a of the base 3 from above (the Z1 side) such that the center of the annular cladding material 304 substantially coincides with the center of the hole 131 of the base 3, as shown in FIG. 12. Thereafter, a portion of the upper surface (the surface on the Z1 side) of the cladding material 304 arranged on the upper surface 3a of the base 3 is pressed with the pressing member 200 from above. Then, the cladding material 104 is pressed with the columnar pressing machine 201 having the diameter L6 of about 5 mm. At this time, the cladding material 304 is pressed in a state where the center of the annular cladding material 304 (the center of the hole 131 of the base 3) substantially coincides with the center of the pressing machine 201 in a plan view. Thus, the cladding material 304 is deformed to extend along the inner peripheral surface 131a of the hole 131 of the base 3 while the pressing machine 201 increases the diameter of the through-hole 343, as shown in FIG. 11. In this manner, the connection portion 4 constituted by the cylindrical portion 4a bonded along the inner peripheral surface 31a of the hole 31 and the annular flange portion 4b formed to partially cover the upper surface 3a of the base 3 is formed. The remaining steps of the manufacturing process according to the modification of the first embodiment of the present invention are similar to those in the first embodiment.

Effects of the modification of the first embodiment of the present invention are similar to those of the first embodiment.

Second Embodiment

A second embodiment of the present invention is now described with reference to FIGS. 6 and 14 to 18. In relation to a bus bar 402 according to this second embodiment, such a case that flange portions 404c are provided also on the side of the lower surface 3b of a base 3 in addition to the aforementioned first embodiment is described. The bus bar 402 is an example of the "connection plate for battery terminals" in the present invention, and the flange portions 404c are examples of the "second flange portion" in the present invention.

The structure of the bus bar 402 according to the second embodiment of the present invention is now described with reference to FIGS. 6 and 14 to 16.

Figure 14:
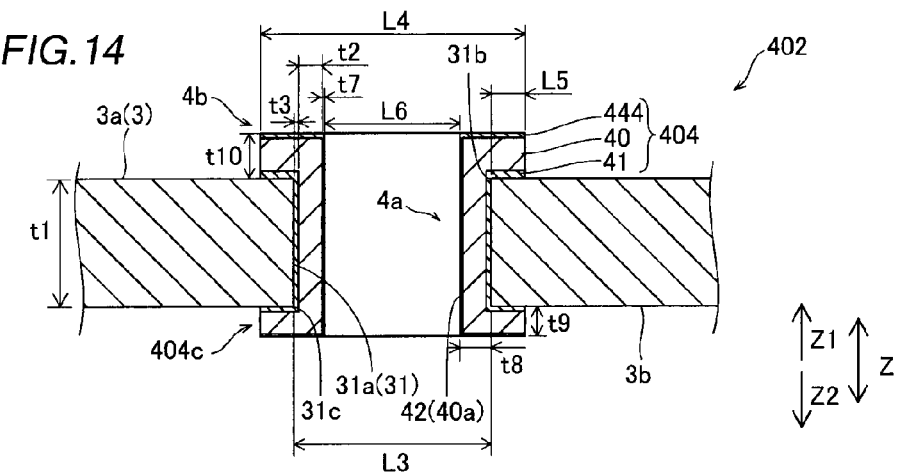
FIG. 14 A sectional view showing a hole provided with a connection portion, of a bus bar according to a second embodiment of the present invention.

In the bus bar 402 according to the second embodiment of the present invention, connection portions 404 are fitted into holes 31 of the base 3, as shown in FIG. 14. The connection portions 404 have cylindrical portions 4a, flange portions 4b, and the flange portions 404c annularly formed to circumferentially surround peripheral regions of open ends 31c of the holes 31 on a Z2 side on the lower surface 3b (the Z2 side) of the base 3. The cylindrical portions 4a and the flange portions 4b are connected to each other at positions corresponding to open ends 31b, and the cylindrical portions 4a and the flange portions 404c are connected to each other at positions corresponding to the open ends 31c. The connection portions 404 are examples of the "battery terminal connection portion" in the present invention, and the flange portions 4b are examples of the "first flange portion" in the present invention.

According to the second embodiment, the connection portions 404 are made of a three-layered cladding material having a Cu layer 40 made of metal (Cu) identical to negative electrode-side terminals 1b, a Ni layer 41, and a Ni layer 444 formed on the side of a hole for connection 42 (the side of the Cu layer 40 opposite to the Ni layer 41) bonded to each other. In other words, Ni layers 41 and Ni layers 444 are made of identical metal (Ni) and are formed on first surfaces and second surfaces of the connection portions 404, respectively, to hold Cu layers 40 therebetween. These Ni layers 444 and Ni layers 41 have higher corrosion resistance as compared with the Cu layers 40. Furthermore, the Ni layers 444 are configured to absorb laser light (wavelength: about 1064 nm) for laser-welding the negative electrode-side terminals 1b of lithium ion batteries 1 and the connection portions 404 about three times more than the Cu layers 40. The Ni layers 444 are examples of the "third layer" in the present invention, and Ni is an example of the "fourth metal" in the present invention.

In the cylindrical portions 4a of the connection portions 404 arranged inside the holes 31 and the flange portions 404c arranged on the lower surface 3b of the base 3, the Ni layers 444 each have a thickness t7 of about 10 μm. In the flange portions 404c, the thickness of each of the Cu layers 40 and the thickness of each of the Ni layers 41 are substantially equal to the thickness t2 (about 1000 μm) of each of the Cu layers 40 and the thickness t3 (about 20 μm) of each of the Ni layers 41 in the cylindrical portions 4a, respectively. In the flange portions 4b arranged on the upper surface 3a of the base 3, the Ni layers 444 each have a thickness larger than the thickness t7 (about 10 μm) in each of the cylindrical portions 4a and the flange portions 404c. In other words, the thicknesses t8 of the cylindrical portions 4a and the thicknesses t9 of the flange portions 404c are smaller than the thicknesses t10 of the flange portions 4b. The connection portions 404 are so configured that the ratio (about 100:2:1) of the thicknesses t2 of the Cu layers 40 to the thicknesses t3 of the Ni layers 41 to the thicknesses t7 of the Ni layers 444 in the cylindrical portions 4a and the flange portions 404c of the connection portions 404 is substantially equal to the ratio of the thicknesses of the Cu layers 40 to the thicknesses of the Ni layers 41 to the thicknesses of the Ni layers 444 in the flange portions 4b.

Figure 15:
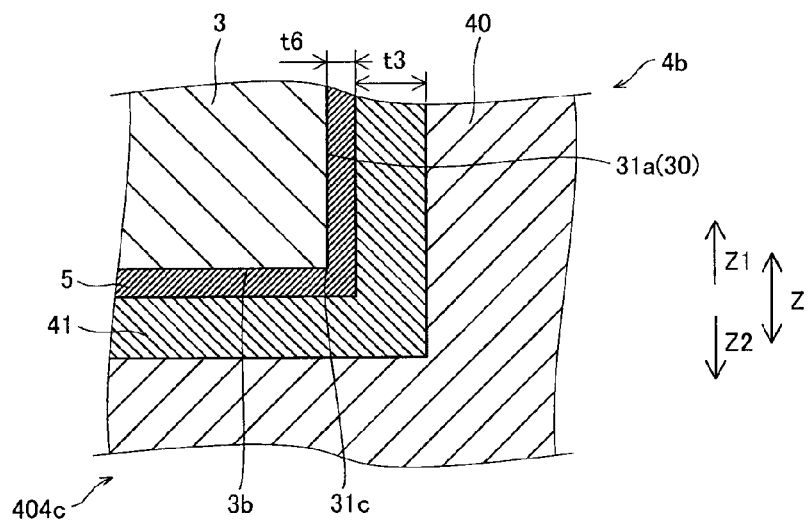
FIG. 15 An enlarged sectional view showing a bonding state between the hole of the bus bar according to the second embodiment of the present invention and the connection portion.

As shown in FIG. 15, intermetallic compound layers 5 containing Al—Ni alloy are formed on not only interfaces between the Ni layers 41 of the connection portions 404 and the inner peripheral surfaces 31a of the holes 31 and interfaces (see FIG. 6) between the Ni layers 41 of the connection portions 404 and the upper surface 3a of the base 3 but also interfaces between the Ni layers 41 of the connection portions 404 and the lower surface 3b of the base 3.

Figure 16:
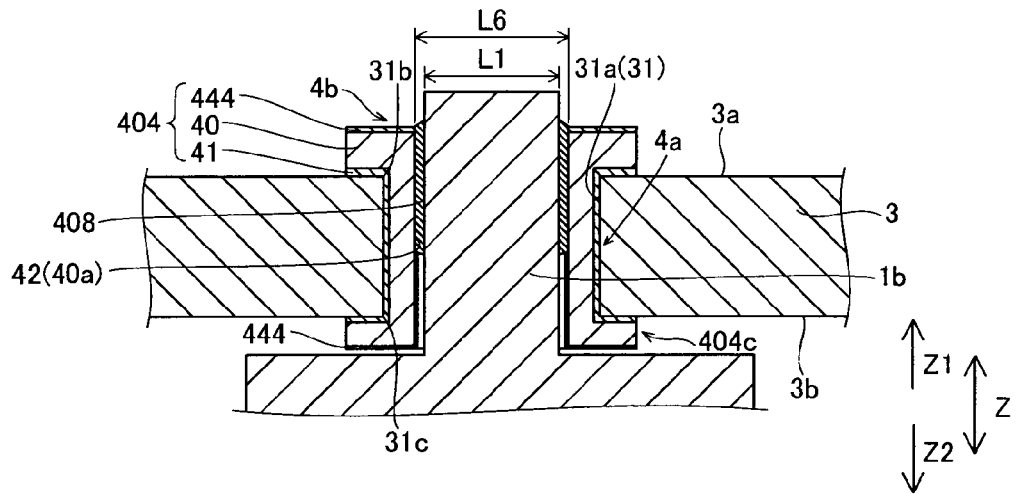
FIG. 16 A sectional view showing a state of welding a hole for connection of the bus bar according to the second embodiment of the present invention and a negative electrode-side terminal of a lithium ion battery to each other.

Furthermore, the negative electrode-side terminals 1b inserted into holes for connection 42 and the Cu layers 40 of the connection portions 404 are bonded to each other through weld portions 408 made of Cu, formed by laser welding, as shown in FIG. 16. In other words, the weld portions 408 each are formed with a thickness of about 0.1 mm between the diameter L1 (about 4.8 mm) of each of the negative electrode-side terminals 1b and the diameter L6 (about 5 mm) of each of the holes for connection 42.

The Ni layers 444 located at portions formed with the weld portions 408 are configured to melt in welding. Thus, the Cu layers 40 of the connection portions 404 and the negative electrode-side terminals 1b are bonded to each other in a state where Cu of the Cu layers 40 of the connection portions 404 is in direct contact with Cu of the negative electrode-side terminals 1b. The weld portions 408 contain Cu—Ni alloy formed by causing Ni of the Ni layers 444 and Cu of the Cu layers 40 and the negative electrode-side terminals 1b to react with each other. The remaining structure according to the second embodiment is similar to that of the aforementioned first embodiment.

A manufacturing process for the bus bar 402 according to the second embodiment of the present invention is now described with reference to FIGS. 6, 15, 17, and 18.

First, a Cu plate (not shown) having a prescribed thickness, a first Ni plate (not shown) having a thickness of about one-fiftieth of the thickness of the Cu plate, and a second Ni plate (not shown) having a thickness of about one-hundredth of the thickness of the Cu plate are prepared. Then, in a state where the first Ni plate is arranged on the lower surface (the surface on the Z2 side) of the Cu plate and the second Ni plate is arranged on the upper surface (the surface on a Z1 side) of the Cu plate, the Cu plate and the pair of Ni plates are bonded to each other while a prescribed pressure is applied thereto. Thus, the plate-like cladding material having the Ni layer 41 corresponding to the first Ni plate, the Cu layer 40 corresponding to the Cu plate, and the Ni layer 444 corresponding to the second Ni plate bonded to each other is formed. At this time, the plate-like cladding material is so formed that the ratio of the thickness of the Ni layer 41 to the thickness of the Cu layer 40 to the thickness of the Ni layer 444 is about 2:100:1. Thereafter, the formed plate-like cladding material is shaped like a disc having a diameter of about 9 mm.

Then, the cladding material is arranged on the upper surface 3a of the base 3 from above (the Z1 side) such that the center of the disc-shaped cladding material substantially coincides with the center of the base 3 in a plan view. Thereafter, a portion of the upper surface (the surface on the Z1 side) of the cladding material arranged on the upper surface 3a of the base 3 is pressed with a pressing member 200 from above. Then, the cladding material is pressed with a columnar pressing machine 201 having a diameter L6 of about 5 mm.

Figure 17:
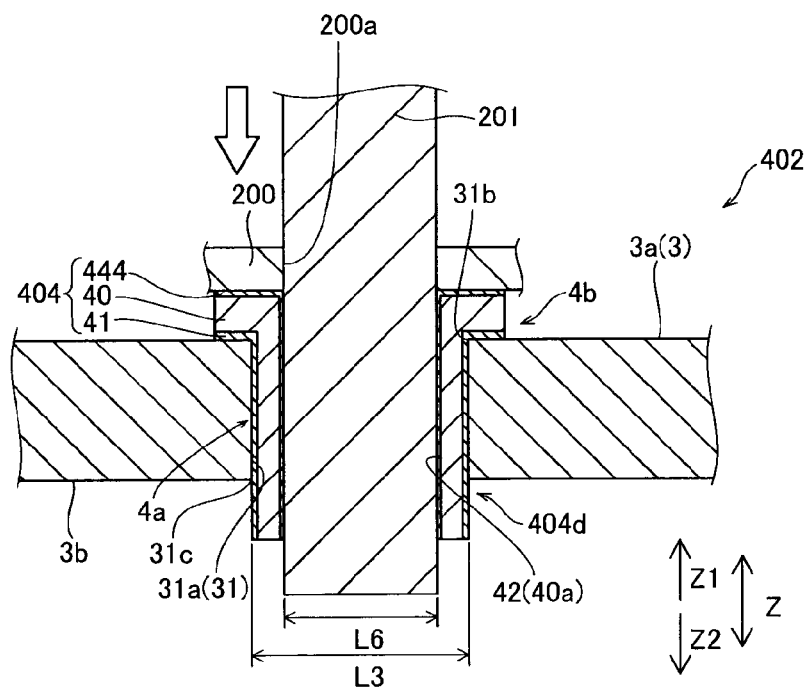
FIG. 17 A sectional view for illustrating a manufacturing process for the bus bar according to the second embodiment of the present invention.

Thus, the disc-shaped cladding material is deformed to extend along the inner peripheral surface of a hole of the base 3 while the pressing machine 201 passes through the disc-shaped cladding material. In this manner, a connection portion 404 constituted by a cylindrical portion 4a bonded along the inner peripheral surface 31a of a hole 31, a flange portion 4b annularly formed to circumferentially surround a peripheral region of an open end 31b of the hole 31 on the Z1 side on the upper surface 3a of the base 3, and a protrusion portion 404d protruding downward from the hole 31 is formed, as shown in FIG. 17.

Figure 18:
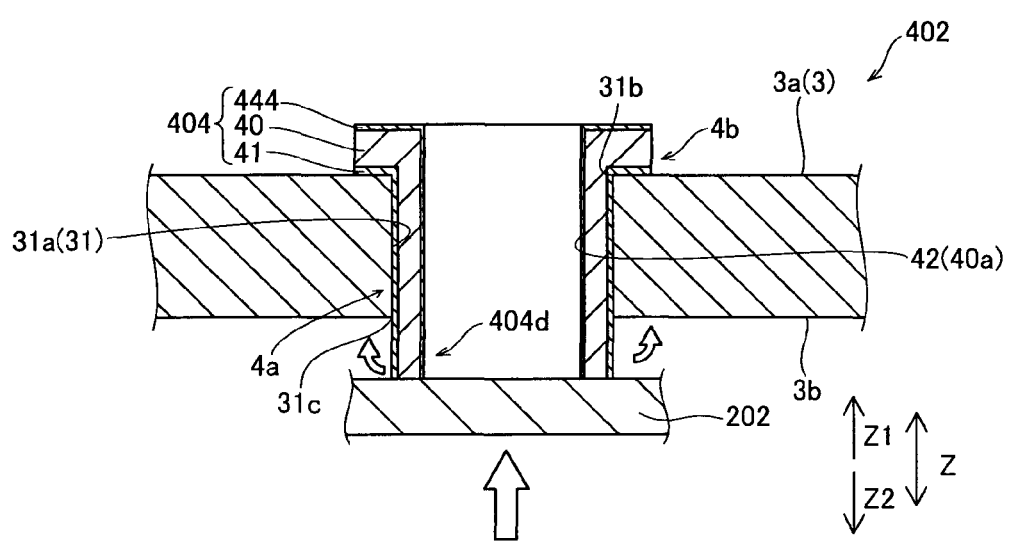
FIG. 18 A sectional view for illustrating the manufacturing process for the bus bar according to the second embodiment of the present invention.

Then, the protrusion portion 404d is pressed with a pressing member 202 from below, as shown in FIG. 18, whereby the connection portion 404 is bent at the open end 31c of the hole 31 on the Z2 side and is arranged along the lower surface 3b of the base 3. Thus, an annular flange portion 404c circumferentially surrounding a peripheral region of the open end 31c of the hole 31 on the Z2 side on the lower surface 3b of the base 3 is formed, as shown in FIG. 14.

After the connection portion 404 is fitted into all the three holes 31, diffusion annealing is performed. Thus, the intermetallic compound layers 5 mainly containing the Al—Ni alloy are formed on the interfaces (see FIGS. 6 and 15) between the Ni layers 41 of connection portions 404 and the inner peripheral surfaces 31a of the holes 31, on the interfaces (see FIG. 6) between the Ni layers 41 of the connection portions 404 and the upper surface 3a of the base 3, and on the interfaces (see FIG. 15) between the Ni layers 41 of the connection portions 404 and the lower surface 3b of the base 3. Thus, the bus bar 402 shown in FIG. 14 is manufactured.

Then, the negative electrode-side terminals 1b (see FIG. 16) of the lithium ion batteries 1 are inserted into the three respective holes for connection 42 of the bus bar 402, circumferentially surrounded by the Ni layers 444 of the connection portions 404. Then, laser welding is performed with laser light having a wavelength of about 1064 nm. Thus, the weld portions 408 mainly made of Cu, containing the Cu—Ni alloy are formed, and the negative electrode-side terminals 1b and the inner peripheral surfaces 40a of the Cu layers 40 of the connection portions 404 are bonded to each other, as shown in FIG. 16. At this time, Ni absorbs the laser light about three times more than Cu, and hence the negative electrode-side terminals 1b and the inner peripheral surfaces 40a of the Cu layers 40 of the connection portions 404 can be more easily welded to each other. The remaining steps of the manufacturing process according to the second embodiment of the present invention are similar to those in the first embodiment.

According to the second embodiment, as hereinabove described, the annular flange portions 4b circumferentially surrounding peripheral regions of the open ends 31b of the holes 31 on the Z1 side on the upper surface 3a of the base 3 are formed, and the annular flange portions 404c circumferentially surrounding the peripheral regions of the open ends 31c of the holes 31 on the Z2 side on the lower surface 3b of the base 3 are formed, whereby the flange portions 4b and 404c can be retained on the upper surface 3a and the lower surface 3b of the base 3, respectively, and hence detachment of the connection portions 404 from the base 3 can be further inhibited. Furthermore, the flange portions 4b and 404c are formed on both the upper surface 3a and the lower surface 3b of the base 3, whereby the bus bar 402 can be employed without distinguishing the upper surface 3a of the base 3 from the lower surface 3b of the base 3, unlike a case where flange portions are formed on only one of the upper surface 3a and the lower surface 3b of the base 3.

According to the second embodiment, as hereinabove described, the plate-like base 3 made of Al is formed with holes 30 and the holes 31, and the connection portions 404 including the Cu layers 40 are fitted into the inner peripheral surfaces 31a of the holes 31 of the base 3, whereby electric resistance at both bonding positions between the positive electrode-side terminals 1a and the base 3 and bonding positions between the negative electrode-side terminals 1b and the Cu layers 40 of the connection portions 404 can be reduced.

According to the second embodiment, as hereinabove described, the connection portions 404 are made of the three-layered cladding material having the Cu layer 40 made of Cu, which is the metal identical to the negative electrode-side terminals 1b, the Ni layer 41 made of Ni, and the Ni layer 444 made of Ni, formed on the side of the hole for connection 42 (the side of the Cu layer 40 opposite to the Ni layer 41) bonded to each other, whereby the Ni layers 41 arranged between the base 3 and the Cu layers 40 can inhibit reaction of the base 3 with the Cu layers 40 also in a case where the bus bar 2 is so configured that Al reacts with Cu when Al constituting the base 3 comes into direct contact with Cu constituting the Cu layers 40. Furthermore, the Ni layers 444 made of Ni having higher corrosion resistance as compared with Cu can inhibit corrosion of the Cu layers 40 made of Cu.

According to the second embodiment, as hereinabove described, the thicknesses t9 of the flange portions 404c are rendered smaller than the thicknesses t10 of the flange portions 4b, whereby even in a case where the negative electrode-side terminals 1b are inserted into the holes for connection 42 from the side (the Z1 side) of the upper surface 3a of the base 3 toward the side (the Z2 side) of the lower surface 3b of the base 3, the thicknesses t9 of the flange portions 404c are smaller (thinner), so that the negative electrode-side terminals 1b can be brought closer to the lower surface 3b of the base 3 along an insertion direction (a direction Z). Thus, the negative electrode-side terminals 1b can be reliably arranged in the holes 31 of the base 3 through the connection portions 404.

According to the second embodiment, as hereinabove described, the Ni layers 444 are made of Ni absorbing the laser light (wavelength: about 1064 nm) for laser-welding the negative electrode-side terminals 1b of the lithium ion batteries 1 and the connection portions 404 about three times more than the Cu layers 40, whereby the Ni layers 444 arranged on the sides of the holes for connection 42 can highly absorb the laser light and easily generate heat, and hence the negative electrode-side terminals 1b and the connection portions 404 can be more easily laser-welded to each other in the holes for connection 42 as compared with a case where no Ni layer 444 is provided.

According to the second embodiment, as hereinabove described, the Ni layers 41 and the Ni layers 444 are made of the identical metal (Ni), whereby even if the plate-like cladding material 104 is mistakenly fitted into the holes 31 such that the Ni layers 41 are located on the sides of the holes for connection 42, which are sides normally provided with the Ni layers 444, and the Ni layers 444 are located on the sides of the inner peripheral surfaces 31a of the holes 31, which are sides normally provided with the Ni layers 41, the mistakenly arranged Ni layers 41 can exhibit such an effect that corrosion of the Cu layers 40 is inhibited, which is the original effect of the Ni layers 444. Similarly, the Ni layers 444 mistakenly arranged on the sides normally provided with the Ni layers 41 can exhibit such an effect that reaction of the base 3 made of Al with the Cu layers 40 is inhibited, which is the original effect of the Ni layers 41. The remaining effects of the second embodiment are similar to those of the aforementioned first embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are further included.

For example, while the example of forming the bus bars 2 by fitting the connection portions 4 (404) made of Cu and Ni into the holes 31 of the base 3 made of Al has been shown in each of the aforementioned first and second embodiments, the present invention is not restricted to this. According to the present invention, the bus bars may be formed by fitting connection members made of Al and Ni into holes of a base made of Cu.

While the example of making the connection portions 4 of the two-layered cladding material having the Cu layer 40 and the Ni layer 41 bonded to each other has been shown in the aforementioned first embodiment and the example of making the connection portions 404 of the three-layered cladding material having the Cu layer 40, the Ni layer 41, and the Ni layer 444 bonded to each other has been shown in the aforementioned second embodiment, the present invention is not restricted to this. The connection portions may be constituted by a Cu layer and a Ni plating layer by plating Ni on at least one of the upper surface and the lower surface of the Cu plate, for example.

While the example of forming the Ni layers 444 (the third layer) made of Ni having higher corrosion resistance as compared with the Cu layers 40 (the first layer) made of Cu in the connection portions 404 has been shown in the aforementioned second embodiment, the present invention is not restricted to this. According to the present invention, the third layer arranged on the side of the first layer closer to the hole for connection may be made of another metal having corrosion resistance higher than that of Cu.

While the example of setting the width W of the bus bar 2 (402) (the base 3 (403)) at about 50 mm and setting the thickness t1 thereof at about 2 mm has been shown in each of the aforementioned first and second embodiments, the present invention is not restricted to this. According to the present invention, the width and thickness of the connection plate for battery terminals are not particularly limited. In general, a large current flows in the connection plate for battery terminals of the lithium ion battery connections, and hence it is necessary to reduce the electric resistance of the connection plate for battery terminals. Therefore, it is preferable that the width and thickness of the connection plate for battery terminals be larger. Specifically, it is preferable that the width of the connection plate for battery terminals be at least about 50 mm and not more than about 200 mm and the thickness of the connection plate for battery terminals be at least about 2 mm and not more than about 4 mm.

While the example of setting the thickness t2 of each of the Cu layers 40 of the connection portions 4 (404) at about 1000 μm and setting the thickness t3 of each of the Ni layers 41 thereof at about 20 μm has been shown in each of the aforementioned first and second embodiments, the present invention is not restricted to this. According to the present invention, the thickness t2 of each of the Cu layers 40 of the connection portions 4 (404) only needs to be at least about 500 μm. Thus, the thickness t2 of each of the Cu layers 40 can be rendered sufficiently large, and hence the negative electrode-side terminals 1b and the connection portions 4 (404) can be reliably welded to each other. In addition, the thickness t3 of each of the Ni layers 41 only needs to be at least about 5 μm.

While the example of setting the thickness t7 of each of the Ni layers 444 of the connection portions 404 at about 10 μm has been shown in the aforementioned second embodiment, the present invention is not restricted to this. According to the present invention, the thickness t7 of each of the Ni layers 444 of the connection portions 404 only needs to be at least about 5 μm. Thus, fracture of the Ni layers 444 due to the excessively small thickness t7 of each of the Ni layers 444 can be inhibited when the connection portions 404 are fitted into the inner peripheral surfaces 31a of the holes 31 of the base 3.

While the example of forming the three holes 30 into which the positive electrode-side terminals 1a are inserted and the three holes 31 into which the negative electrode-side terminals 1b are inserted in the base 3 has been shown in each of the aforementioned first and second embodiments, the present invention is not restricted to this. According to the present invention, two or less holes 30 or four or more holes 30 into which the positive electrode-side terminals 1a are inserted and two or less holes 31 or four or more holes 31 into which the negative electrode-side terminals 1b are inserted may be formed in the base 3.

While the example of pressing the annular cladding materials 304 formed with the through-holes 343 each having the inner diameter L8 of about 4 mm in the central portions into the base 3 has been shown in the modification of the aforementioned first embodiment, the present invention is not restricted to this. According to the present invention, the inner diameter L8 of each of the through-holes 343 of the cladding materials 304 only needs to be smaller than the diameter L6 (about 5 mm) of the pressing machine 201. In order to reliably form the connection portions 4 by press working, it is preferable that the inner diameter L8 of each of the through-holes 343 be not more than about 4 mm.

While the example of forming the intermetallic compound layers 5 on the interfaces between the base 3 and the connection portions 4 (404) by diffusion annealing has been shown in each of the aforementioned first and second embodiments, the present invention is not restricted to this. According to the present invention, no intermetallic compound layer may be formed on the interfaces between the base 3 and the connection portions. Thus, the manufacturing process can be simplified.

The invention claimed is:

1. A connection plate for battery terminals (2, 402), comprising:
    a plate-like base (3) including a first hole (30) into which a first battery terminal (1a) made of first metal is inserted and a second hole (31) into which a second battery terminal (1b) made of second metal different from the first metal is inserted, made of metal identical to the first metal; and
    a battery terminal connection portion (4, 404) fitted into an inner peripheral surface (31a) of the second hole of the base, including a hole for connection (42) into which the second battery terminal is inserted and a flange portion (4b, 404c) arranged on at least one of an upper surface (3a) and a lower surface (3b) of the base, wherein
    the battery terminal connection portion is constituted by at least a first layer (40) made of metal identical to the second metal, arranged on a side opposite to the base and a second layer (41) made of third metal different from the first metal and the second metal, arranged between the base and the first layer.

2. The connection plate for battery terminals according to claim 1, wherein
    an intermetallic compound layer (5) containing alloy made of the first metal constituting the base and the third metal constituting the second layer is formed on an interface between the base and the second layer of the battery terminal connection portion.

3. The connection plate for battery terminals according to claim 2, wherein
the intermetallic compound layer is formed on an interface between the inner peripheral surface of the second hole of the base and the second layer of the battery terminal connection portion and on an interface between at least one of the upper surface and the lower surface of the base and the second layer of the battery terminal connection portion in the flange portion.

4. The connection plate for battery terminals according to claim 1, wherein
the battery terminal connection portion is made of a cladding material constituted by at least the first layer and the second layer.

5. The connection plate for battery terminals according to claim 1, wherein
the first metal is one of Al and Cu, the second metal is the other of Al and Cu, and the third metal is Ni.

6. The connection plate for battery terminals according to claim 5, wherein
the second layer of the battery terminal connection portion has a thickness of at least 5 μm.

7. The connection plate for battery terminals according to claim 5, wherein
the first metal is Al, and the second metal is Cu, and
a thickness of the first layer made of Cu is larger than a thickness of the second layer made of Ni in the battery terminal connection portion.

8. The connection plate for battery terminals according to claim 1, wherein
the flange portion is annularly formed to circumferentially surround the second hole.

9. The connection plate for battery terminals according to claim 1, wherein
a thickness of the flange portion is at least a thickness of a portion fitted into the inner peripheral surface of the second hole of the base in the battery terminal connection portion.

10. The connection plate for battery terminals according to claim 1, wherein
the second battery terminal is configured to be inserted into the hole for connection from a side of the lower surface of the base toward a side of the upper surface thereof, and
the flange portion is arranged on at least the upper surface of the base.

11. The connection plate for battery terminals according to claim 1, wherein
the flange portion has a first flange portion (4b) arranged on the upper surface of the base and a second flange portion (404c) arranged on the lower surface of the base.

12. The connection plate for battery terminals according to claim 11, wherein
the second battery terminal is configured to be inserted into the hole for connection from a side of the lower surface of the base toward a side of the upper surface thereof, and
a thickness of the second flange portion is smaller than a thickness of the first flange portion in the battery terminal connection portion.

13. The connection plate for battery terminals according to claim 1, wherein
the battery terminal connection portion is constituted by the first layer, the second layer, and a third layer (444) arranged on a side of the first layer closer to the hole for connection, made of fourth metal having higher corrosion resistance as compared with the second metal constituting the first layer.

14. The connection plate for battery terminals according to claim 13, wherein
the fourth metal constituting the third layer of the battery terminal connection portion is made of a metal material absorbing more laser light employed in laser welding than the second metal constituting the second battery terminal.

15. The connection plate for battery terminals according to claim 13, wherein
the third metal and the fourth metal are made of identical metal.

16. The connection plate for battery terminals according to claim 1, wherein
the first hole of the base is so configured that the first battery terminal is inserted thereinto without the battery terminal connection portion therebetween, and
the second hole of the base is so configured that the second battery terminal is inserted thereinto with the battery terminal connection portion therebetween.

17. A method for manufacturing a connection plate for battery terminals (2, 402), comprising steps of:
providing a first hole (30) into which a first battery terminal (1a) made of first metal is inserted and a second hole (31) into which a second battery terminal (1b) made of second metal different from the first metal is inserted in a plate-like base (3) made of metal identical to the first metal;
preparing a plate-like member (104, 304) constituted by at least a first layer (40) made of metal identical to the second metal and a second layer (41) made of third metal different from the first metal and the second metal; and
forming a battery terminal connection portion (4, 404) including a hole for connection (42) into which the second battery terminal is inserted and a flange portion (4b, 404c) arranged on at least one of an upper surface (3a) and a lower surface (3b) of the base, fitted into an inner peripheral surface (31a) of the second hole of the base by press working in a state where a side of the second layer of the plate-like member is arranged to cover the second hole of the base and a part of the upper surface of the base.

18. The method for manufacturing a connection plate for battery terminals according to claim 17, further comprising a step of forming an intermetallic compound layer (5) containing alloy made of the first metal constituting the base and the third metal constituting the second layer on an interface between the base and the second layer of the battery terminal connection portion by diffusion annealing after the step of forming the battery terminal connection portion.

19. The method for manufacturing a connection plate for battery terminals according to claim 17, wherein
the step of preparing the plate-like member includes a step of forming the plate-like member made of a cladding material by applying a prescribed pressure to bond a first metal plate made of the second metal and a second metal plate made of the third metal to each other.

20. The method for manufacturing a connection plate for battery terminals according to claim 17, wherein
the step of forming the battery terminal connection portion includes a step of forming the battery terminal connection portion including the flange portion and the hole for connection, fitted into the inner peripheral surface of the second hole of the base by the press working in a state where the side of the second layer of the plate-like member circularly or annularly formed is arranged to cover the second hole of the base and the part of the upper surface of the base.

\* \* \* \* \*